June 16, 1925.
M. M. MORATTA
SELF TIGHTENING BOLT
Filed March 10, 1924
1,542,467
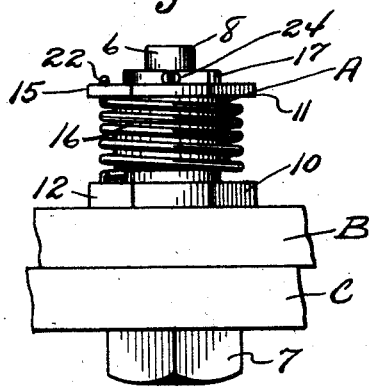
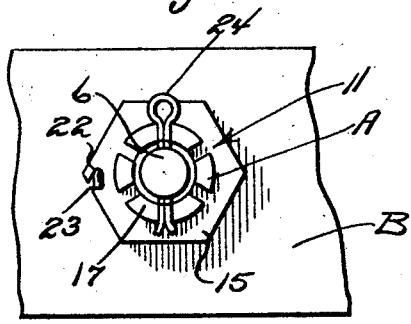
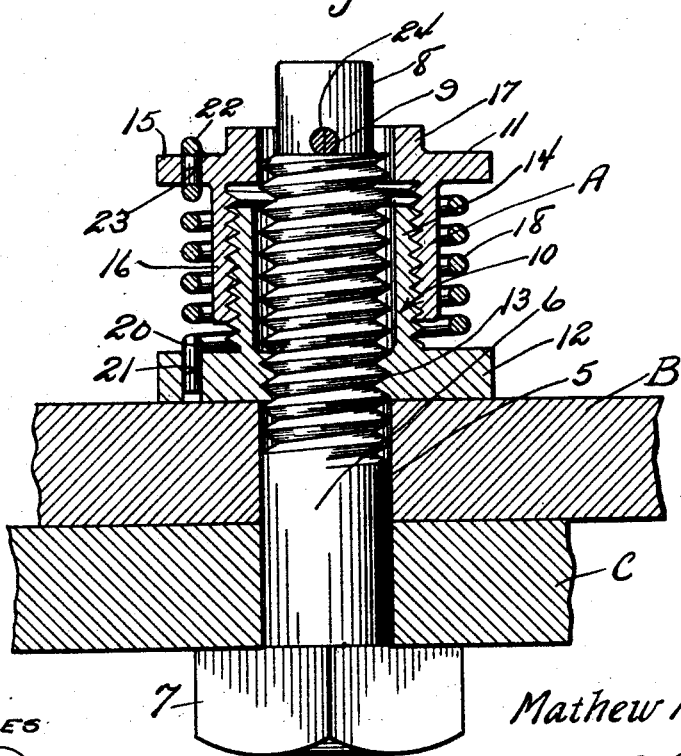
Inventor
Mathew M. Moratta.

Patented June 16, 1925.

1,542,467

UNITED STATES PATENT OFFICE.

MATHEW M. MORATTA, OF PRINCETON, INDIANA.

SELF-TIGHTENING BOLT.

Application filed March 10, 1924. Serial No. 698,292.

*To all whom it may concern:*

Be it known that I, MATHEW M. MORATTA. a citizen of the United States, residing at Princeton, in the county of Gibson and State of Indiana, have invented certain new and useful Improvements in Self-Tightening Bolts, of which the following is a specification.

This invention appertains to nuts and bolts for use in connection with bearings and the like and the primary object of this invention is to provide an improved automatic take-up nut and bolt for compensating for the wear on the bearings.

Another object of the invention is to provide a self-tightening nut and bolt, which will also act as a nut lock to prevent the accidental unthreading of the nut through vibration, in case the automatic take-up spring should be rendered inoperative for any reason.

A further object of the invention is the provision of an automatic take-up nut and bolt embodying a pair of nut sections, threadedly connected together, one of the sections having rigid contact with the shank of the bolt, and the other section having threaded contact with the shank of the bolt, the sections being resiliently connected together by a coiled spring, which normally tends to unthread the nut sections relative to one another for tightening up the bolt so as to effectively take up any wear on the bearings.

A still further object of the invention is to provide an improved device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a side elevation of an improved take-up nut and bolt showing the same applied to the work, Figure 2 is a top plan view of the same, and Figure 3 is an enlarged longitudinal section through the take-up nut and bolt showing the same applied to work, the work being shown in section.

Referring to the drawings in detail, wherein similar reference characters designate corresponding parts throughout the several views, the letter A generally indicates the take-up nut and bolt and B and C the sections of the work which can be considered as companion bearing portions. The work sections B and C are provided with aligned openings 5.

The improved take-up nut and bolt comprises the bolt shank 6 having the bolt head 7 formed on one end thereof. The bolt shank 6 is threaded for a portion of its length as clearly shown in Figure 3 of the drawings. The extreme outer end of the shank 6 is left plain as indicated by the reference character 8 and provided with a diametrically extending opening 9.

An inner nipple nut section 10 and an outer barrel section 11 are provided for receiving the shank 6 of the bolt and the inner nipple nut section 10 embodies the body portion 12 which is provided with internal threads 13 for engaging the threads of the bolt and an externally threaded nipple or sleeve 14. The outer barrel section 11 includes a body 15 arranged in spaced parallel relation to the body 12 and a cylindrical sleeve or barrel portion 16 which is internally threaded for receiving the threads formed on the nipple or sleeve portion 14 of the inner nipple nut section 10. The extreme outer end of the barrel nut section 11 is provided with a castellated head 17.

A relatively heavy spring 18 is coiled about the barrel section 11 and is adapted to be confined between the body portions 12 and 15 of the nut sections 10 and 11 and the inner end of the spring is provided with a foot 20 for engaging in an anchoring opening 21 formed in the body 12 of the nipple nut section 10. The outer end of the spring is provided with a hook 22 which is adapted to fit in an inclined slot 23 formed in the body 15 of the barrel nut section 11. A suitable locking cotter key 24 is adapted to pass through the diametrically extending opening 9 formed in the shank 6 for engaging the castellated head 17 of the outer nut section 11, for a purpose which will be hereinafter more fully described.

In use of the improved takeup bolt and nut A, the shank 6 of the bolt is passed through the aligned openings 5 in the work sections B and C and the nipple nut section 10 is threaded on the shank of the bolt in engagement with the work after which the coil spring 18 is placed on the same with the hook 20 in the opening 21. The barrel nut section 11 is now threaded on the sleeve or nipple portion 14 of the nut section 10 to the desired position after which the hook 22 of the spring is placed in the notch 23. The outer nut section 11 can now be rotated further to place the spring under the desired tension after which a cotter pin 24 is placed through the opening 9 for engagement with the castellated head 17. It is obvious that as the bearing wears, that the spring 18 will have a tendency to unwind, which will tend to spread the sections 10 and 11 thus effectively tightening up the bolt and maintaining an even pressure on the bearing or work sections B and C.

The device also functions, as a nut lock, and it can be seen that should the spring 18 break that unthreading of the nut sections 10 and 11 will be precluded in view of the cotter pin 24.

When the nut and bolt are in use, vibration will be precluded between the nut sections and bolt due to the rigid connection between the cotter pin 24 and the castellated head 17.

Changes in detail may be made without departing from the spirit or the scope of this invention, but what I claim as new is:

In a self-tightening nut and bolt, the combination with a bolt including a threaded shank having a diametrically extending opening therethrough adjacent to the outer end thereof, of a nut including an inner nipple section having a body portion threaded upon the shank of the bolt and a sleeve provided with external threads, an outer nut barrel section including a body portion and an internally threaded barrel portion arranged to engage the threads of the sleeve portion of the inner nipple nut section, a castellated head formed on the body portion of the outer barrel section, a coil spring coiled about the nut sections and between the body portions thereof, means for anchoring the inner end of the spring to the body portion of the inner nipple nut section, the body portion of the outer barrel nut section having an inclined notch therein, a hook formed on the outer end of the spring arranged to detachably engage in said notch, and a cotter pin arranged to extend through the opening in the shank of the bolt to engage with the castellated head of the outer barrel nut section.

In testimony whereof I affix my signature in presence of two witnesses.

MATHEW M. MORATTA.

Witnesses:
 ISAAC E. CRISWELL,
 ESTHER YOCHUM.